United States Patent [19]
Roney et al.

[11] Patent Number: 4,537,446
[45] Date of Patent: Aug. 27, 1985

[54] SAFETY SEAT

[75] Inventors: Thomas W. Roney; Maynard L. Adams, both of Battle Creek, Mich.

[73] Assignee: Clark Equipment Company, Buchanan, Mich.

[21] Appl. No.: 520,140

[22] Filed: Aug. 4, 1983

[51] Int. Cl.³ ............................................. A62B 35/00
[52] U.S. Cl. .................................... 297/464; 280/802; 296/65 A; 297/468; 297/488
[58] Field of Search ............... 297/464, 488, 487, 468, 297/469, 417; 296/65 A; 280/802

[56] References Cited

U.S. PATENT DOCUMENTS

| | | | |
|---|---|---|---|
| 1,271,515 | 7/1918 | Murray | 297/464 |
| 1,646,790 | 10/1927 | Hornquist | 297/464 |
| 3,165,333 | 1/1965 | Dalgleish | 297/487 X |
| 3,922,030 | 11/1975 | Stedman | 296/65 A |
| 4,073,538 | 2/1978 | Hunter | 297/417 |

FOREIGN PATENT DOCUMENTS 258914 4/1913 Fed. Rep. of Germany ...... 297/487
1177509 1/1970 United Kingdom ................ 297/488

Primary Examiner—James T. McCall
Attorney, Agent, or Firm—Marmaduke A. Hobbs

[57] ABSTRACT

A safety seat assembly for use with industrial vehicles, such as fork lift trucks, that employs both upper and lower body restraints to prevent the ejection of the operator from the vehicle cab area in the event of a lateral overturn. The lower body restraint is provided by the cooperation of the arm rests and a safety belt which is selectively engageable with the arm rests. The left arm rest pivots outwardly and the belt hinges to an upright position, facilitating access to the seat. The upper body restraint is provided by forwardly extending guard members attached to arms which project laterally from the back support on each side of the seat assembly.

18 Claims, 16 Drawing Figures

U.S. Patent Aug. 27, 1985 Sheet 1 of 4 4,537,446
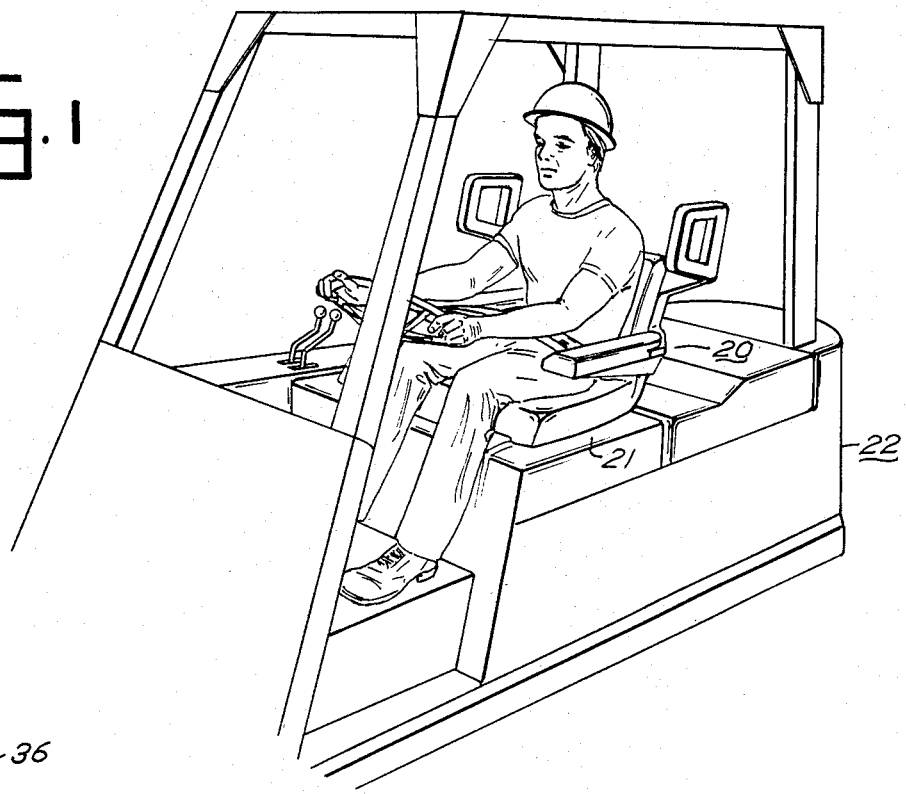
Fig.1
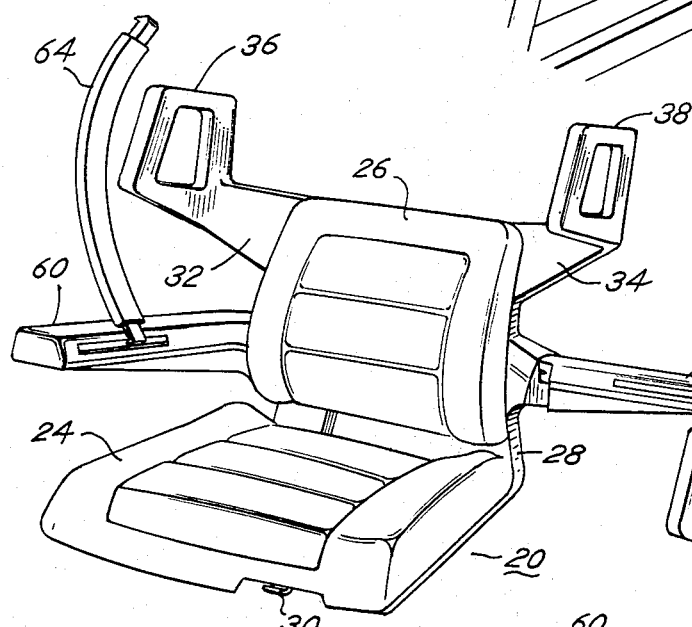
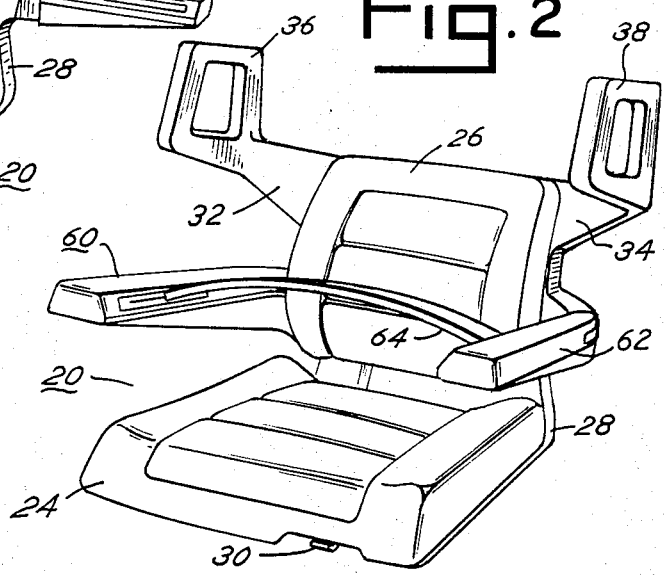
Fig.2
Fig.3

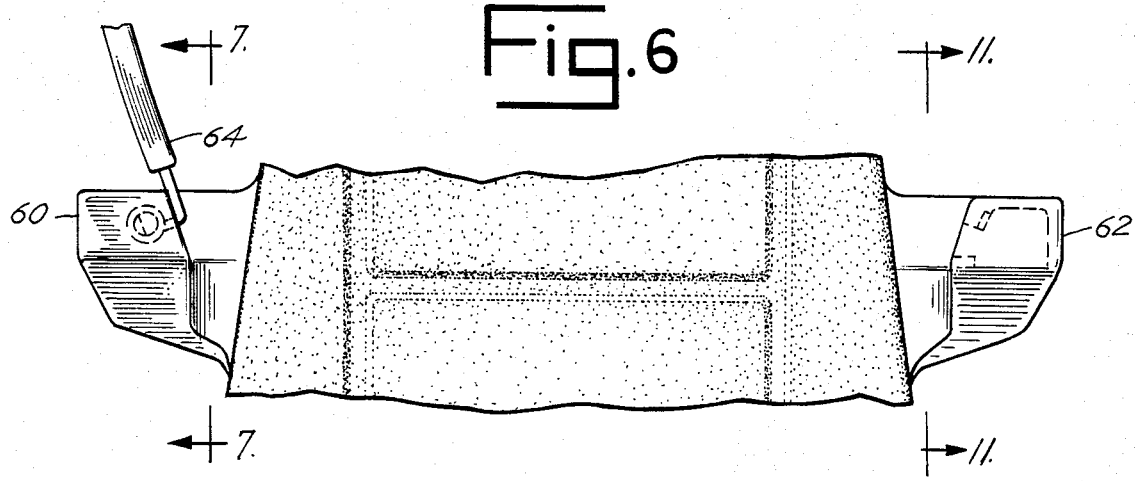
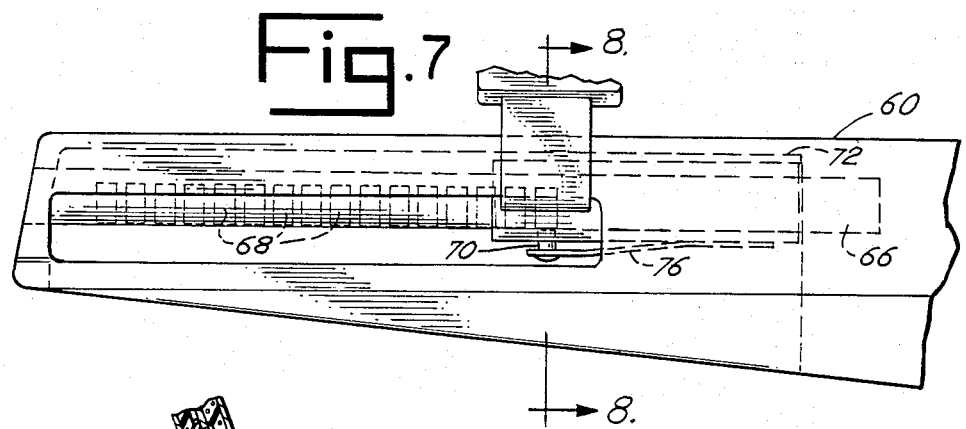
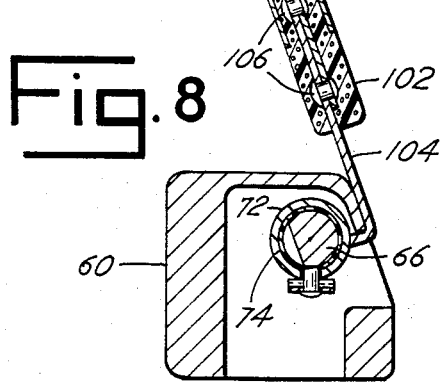 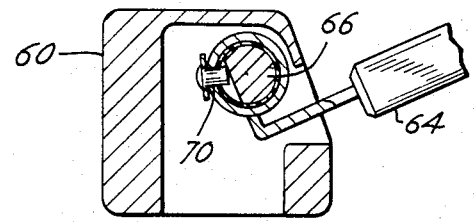
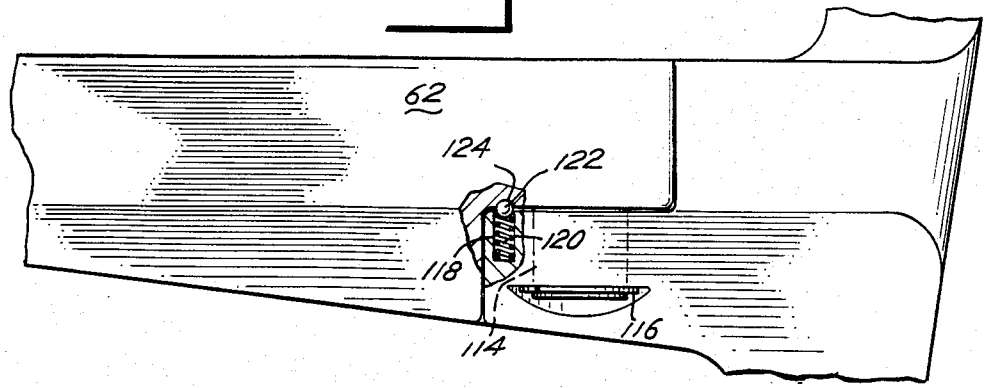

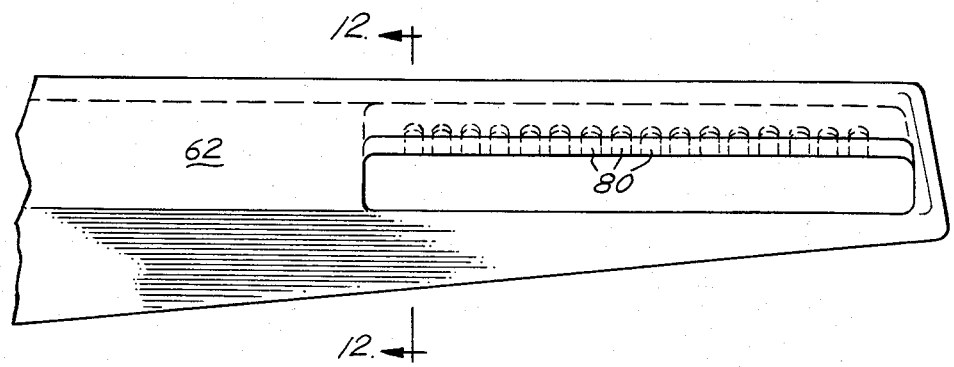
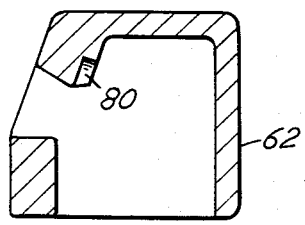
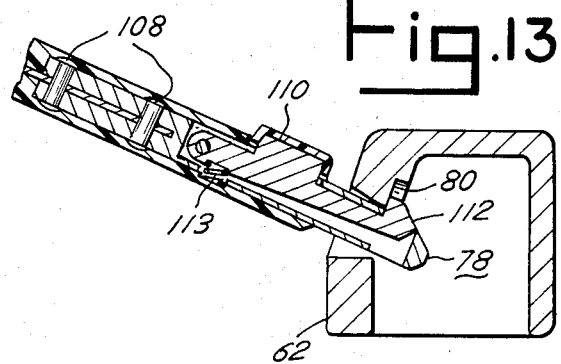
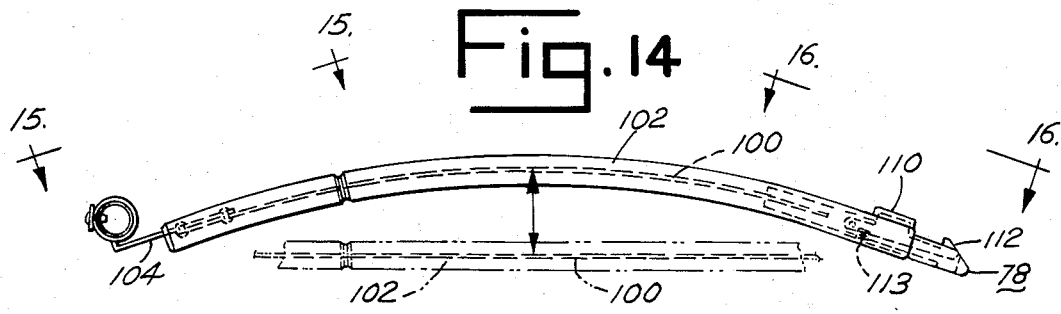
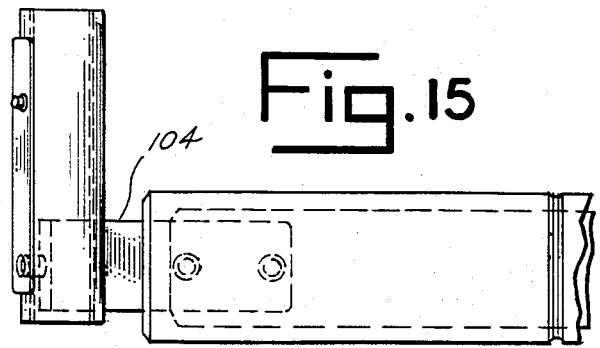
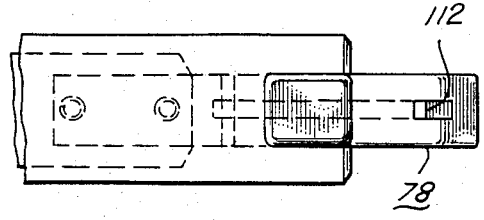

SAFETY SEAT

BACKGROUND OF THE INVENTION

1. Field of the Invention

This invention relates to the field of industrial machines such as forklift trucks, and more particularly to an occupant safety seat for protecting the operator.

2. Description of the Prior Art

While extensive research has been done in the field of restraining means for protecting consumer motor vehicle operators, the problem has been to find a suitable device for industrial machines that will be accepted and used by the operator without overly restricting his ingress and egress, visibility, and upper body movement, all critical for safe operation, especially for the factory and warehouse uses of lift trucks employing an overhead guard. For years, seat belts have been proposed. Lap belts, shoulder harnesses and three point automotive type belts have the chief disadvantage, for a typical lift truck, where the width is narrow and the seat is offset to one side of the truck centerline, that the upper body of the operator can still be thrust to one side by lateral forces, in spite of the belt, possibly causing injury to the operator who comes into contact with an object, or the truck itself.

Side screens or doors on the overhead guard would contain the operator, but are easily defeated or removed, and often prove detrimental because new hazards are created due to head/overhead guard, underside impact and reduced visibility. Loads are not properly spotted, or factory workers not seen in time, resulting in injury to bystanders from falling boxes or to pedestrians run down in plant aisles.

In cases of misuse, the truck may tip upon two wheels or, when operated carelessly, even upset, and unless restrained inside the overhead guard, the operator is subject to injury. The hazard then is likely to be the overhead guard itself. But operation of the lift truck without its overhead guard, to avoid injury to the few careless operators who misuse the truck, would expose the many careful operators to far greater hazards from falling loads in their normal work environments; thus, no safety standard calls for seat belts or side screens, but the overhead guard is required by all safety codes applicable to lift trucks except in strictly defined, low lift uses. There remains the problem then that no acceptable safety seat arrangement has heretofore been invented for use with an overhead guard on industrial machines, such as forklift trucks.

SUMMARY OF THE INVENTION

It is, therefore, one of the principal objects of the present invention to provide an occupant safety seat which protects the operator of a machine by providing upper body containment in combination with lower body restraint. The combination is critical in that it does not overly restrict the movements or obscure the vision of the operator, or otherwise impair his ability to operate the machine safely due to required upper body mobility within the lateral profile of the machine, while the lower body restraint restricts freedom of movement to a larger degree below the waist.

Another object of the present invention is to provide such a seat in connection with a lift truck having an overhead guard in which the seat affords freedom of movement to a degree outside the lateral profile of the guard when desired, but also prevents his upper body from being thrust outside the guard when forces acting on the truck laterally are higher than occur in normal operations.

A further object of the present invention is to provide a safety seat which includes a catch for a hinged seat deck, usually to allow access to an engine compartment, but in addition the catch and deck are designed to withstand the forces generated with the operator secured on the seat in event of a crash or upset.

A still further object of the present invention is to provide a seat having an upper passive lateral containment device asymmetrically offset relative to the seat back, and opposite the direction the seat is itself offset relative to the truck centerline. This device is intended for use in conjunction with a lower, actively applied restraint which pivots out of the way to permit easy ingress and egress, but fastens reasonably snugly about the waist, restraining the operator to a large degree from free movement in the hip area.

BRIEF DESCRIPTION OF THE DRAWINGS

FIG. 1 is a perspective view of the safety seat assembly embodying the present invention, shown here mounted in the cab portion of a fork lift truck with an operator seated thereon;

FIG. 2 is a perspective view of the safety seat assembly, illustrating the upper body restraint members and the closed position of the pivoting left arm rest and the hinged belt;

FIG. 3 is a perspective view of the safety seat assembly similar to FIG. 2, shown here apart from its installed position, and illustrating the upper body restraint members and the open position of the pivoting left arm rest and the hinged belt;

FIG. 6 is a partial front elevational view of the safety seat assembly similar to that shown in FIG. 5, here illustrating the safety belt in an open position;

FIG. 7 is a side elevational view of the right arm rest, the broken lines illustrating the slots and the adjustment mechanism therein, the view being taken on line 7—7 of FIG. 6;

FIG. 8 is a cross-sectional view of the right arm rest, illustrating the belt hinge in an open position with the locking pin not in communication with the slot, the section being taken on line 8—8 of FIG. 7;

FIG. 9 is a cross-sectional view of the right arm rest similar to that shown in FIG. 8, illustrating the belt hinge in a closed position with the locking pin in communication with the slot, the section being taken on line 8—8 of FIG. 7;

FIG. 10 is a side elevational view, shown partially in cross-section, of the pivoting left arm rest, illustrating the spring-ball detent mechanism, the section being taken on line 10—10 of FIG. 4;

FIG. 11 is a side elevational view of the left arm rest, the broken lines illustrating the plurality of adjustment indents therein, the view being taken on line 11—11 of FIG. 6;

FIG. 12 is a cross-sectional view of the left arm rest illustrating the indents for receiving the belt latch, the section being taken on line 12—12 of FIG. 11;

FIG. 13 is a cross-sectional view of the left arm rest and a portion of the safety belt similar to that shown in the preceding figure, shown here with the belt latch inserted, the section being taken on line 12—12 of FIG. 11;

FIG. 14 is a front elevational view of the safety belt shown in its normal curved position with its deflected adjustment position shown in broken lines;

FIG. 15 is a top plan view of the right half of the safety belt, the broken lines illustrating the hinging mechanism, the view being taken from line 15—15 of FIG. 14; and FIG. 16 is a top plan view of the left half of the safety belt, the broken lines illustrating the belt latching mechanism, the view being taken from line 16—16 of FIG. 14.

DETAILED DESCRIPTION OF THE PREFERRED EMBODIMENT

Figure 4:
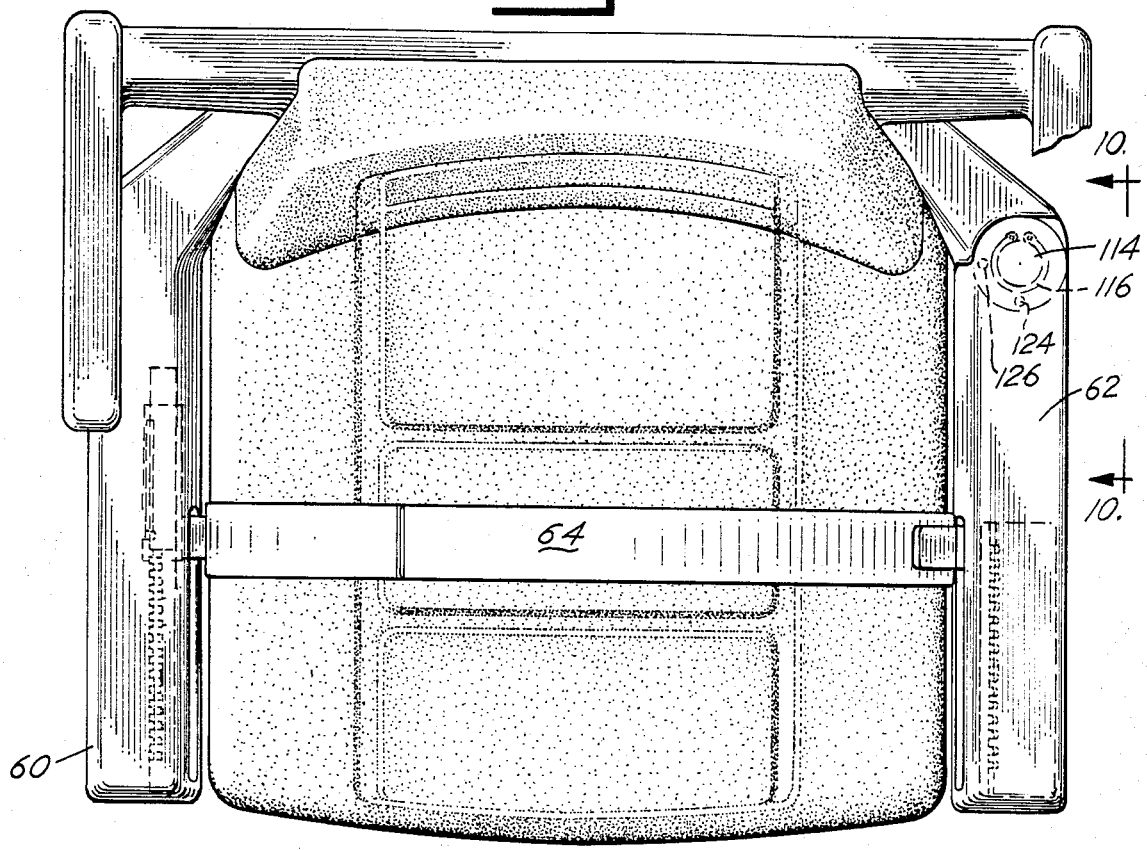
FIG. 4 is a top plan view of the safety seat assembly, the broken lines illustrating the position of the pivoting mechanism for the left arm rest and the adjustment mechanisms for the safety belt disposed within the arm rests.

Referring more specifically to the drawings, and to FIG. 1 in particular, numeral 20 designates generally the safety seat assembly embodying the present invention. The seat assembly is shown here mounted in the cab portion of a fork lift truck 22. It is to be understood that while the present invention is particularly advantageous for use with fork lift trucks, it may also be used in other vehicles having relatively exposed operator stations, as, for example, bulldozers. All references to either the right or the left side are taken from the perspective of the operator when seated in the vehicle and will thus be opposite from the positions shown in the drawings.

The seat assembly has a seat member 24 and a back support member 26 mounted on a continuous frame 28 having the general configuration of a chair. An adjustment lever 30 has been provided near the base of the seat member for sliding adjustment of the seat assembly either forward or backward in the cab portion of the vehicle. The seat deck 21 is hinged and includes a catch (not shown) for securing the deck, normally to allow access to an engine compartment, and in addition, the catch and deck are designed to withstand the forces generated with the operator secured on the seat, in the event of a crash or upset. Extending laterally to each side from the frame 28 behind the back support member 26 and generally parallel with the plane of the back support member, are arms 32 and 34 for the right and left sides, respectively. Mounted on the ends of the arms are generally rectangular, upper body restraining members 36 and 38 for the right and left sides, respectively, the members being generally perpendicular to the plane of the back support member 26. These upper body restraints keep the head and shoulders of the operator within the confines of the vehicle cab, even in the event of a lateral overturn, where the vehicle is tipped over to one side or the other. The upper body restraints have been designed to accomplish the aforementioned purpose, whether or not the safety belt or other seat belt is used by the operator, thereby providing maximum protection to the operator. The generally rectangular configuration of the members 36 and 38, having an open center portion, provides virtually unobstructed visibility to either side of the vehicle, and the location of the arms provides unobstructed visibility to the rear.

A stationary arm rest 60 has been provided on the right side of the seat assembly and extends forwardly from a position near the right lower edge of the back support member and generally parallel with the plane of the seat member 24. A pivoting arm rest 62 has been provided on the left side of the seat assembly, the arm rests providing partial passive lower body restraints. In its closed position, as shown in FIG. 2, the left arm rest extends forwardly from a position near the left lower edge of the back support member and generally parallel with the plane of the seat member. The left arm rest pivots, as shown in FIG. 3, to a position approximately perpendicular to its closed position, the open position allowing the operator easy ingress to and egress from the seat assembly. The pivoting mechanism will be explained in detail below. Disposed across the lap of the operator is a semi-rigid safety belt 64, the ends of which are inserted into receiving portions in the right and left arm rests. The belt is shown in its closed position in FIG. 2. The belt can be disengaged from the left arm rest and pivoted upwardly, as shown in FIG. 3, allowing the operator easy ingress to and egress from the seat assembly. The belt is adjustable either toward or away from the operator, either before or after it is closed, as described below.

Figure 5:
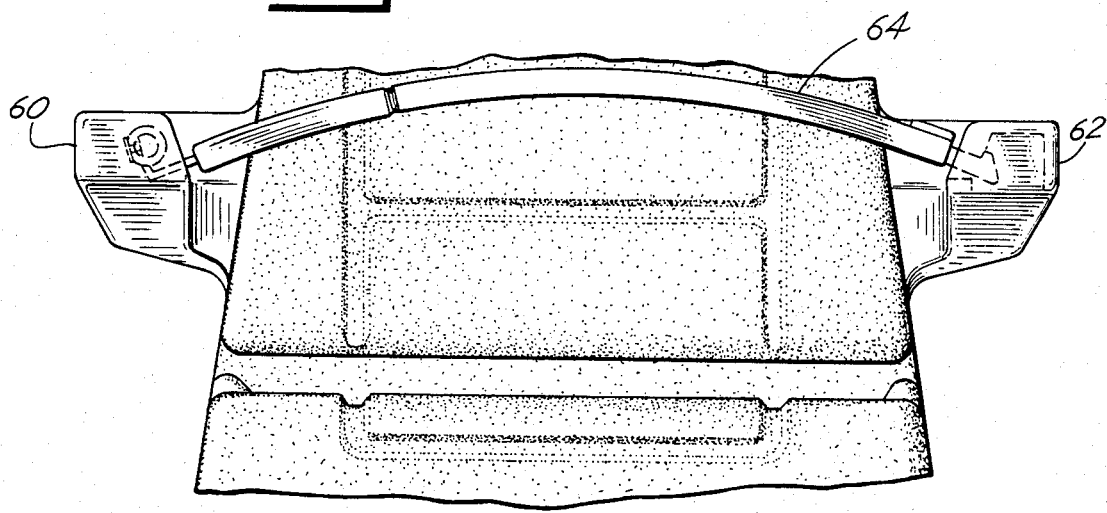
FIG. 5 is a partial front elevational view of the safety seat assembly, the broken lines illustrating the hinging mechanism of the safety belt in the right arm rest and the latching mechanism of the belt in the left arm rest.

FIGS. 4 and 5 show the belt 64 in its closed position and partially illustrate the adjustment mechanisms in the arm rests. Within the stationary right arm rest is a steel rod 66 having a plurality of slots 68 formed in the outer side thereof for selective engagement with a pin 70. Surrounding, and axially slidable on, the rod 66 is a tube 72 with a nylon liner 74 which facilitates movement of the slidable tube and pin. When the belt is in closed position, as shown in FIG. 9, the pin 70 is seated in one of the slots 68. As the belt is moved to an open position, as shown in FIG. 8, the pin rotates to the bottom of the rod 66 and out of the slot 68. At this point, the pin, which is secured to the slidable tube by means of a flat spring 76, is deflected downwardly and is not in communication with any of the slots, shown clearly in FIG. 7. With the pin so deflected, the belt can be slid forward or backward prior to its being closed by the operator, thus providing a preliminary adjustment. The length of travel of the belt is shown in FIG. 4, and extends from near the front portions of the arm rests to their approximate midpoint.

As the belt is closed, the pin is rotated in a clockwise direction as viewed in FIG. 9, and enters one of the slots, urged inwardly by the flat spring. The belt is secured in a closed position by inserting the free end with the latch assembly 78 into the opening provided in the left arm rest. The latch is selectively engageable with one of a plurality of indents 80 disposed in the inside wall of the left arm rest 62, shown in FIGS. 11 through 13. The belt has a spring steel insert 100 with a self-skinned, foam rubber cover 102. A connecting band 104 is secured to the belt insert in a conventional manner, as by rivets 106, with the opposite end of the connecting band secured to the slidable tube 72 in the right arm rest. The opposite end of the spring steel insert is secured to the latch assembly 78 in a conventional manner, as by rivets 108. The latch end of the belt can be removed by depressing button 110, which deflects the latch 112 downwardly against the force of spring 113 and away from the indents, thereby permitting its removal.

The belt can also be adjusted forward or backward when it is in a closed position. As shown in FIG. 14, the belt is normally in a curved or convex position when closed, thereby securing the lower body of the operator in the seat while allowing sufficient leg room for comfortable use and operation of the vehicle. The spring steel insert 100 allows the belt to be deflected downwardly toward a horizontal position. This deflection effectively lengthens the belt and causes the tube in the right arm rest to rotate in a clockwise direction toward the top of the rod 66, as shown in FIG. 9. The pin 70 is cammed out of the slot 68, allowing free sliding movement for this end. The lengthening of the belt by this deflection forces the latch 112 out of engagement with the indent 80, allowing this end to slide freely. By deflecting the belt in this manner, the operator can slide the belt forward or backward as required to maximize safety and comfort without opening the belt. When the desired position is attained, the downward pressure on the belt is released and the spring steel insert urges the belt back to its normal convex position. The inward movement of the right end of the belt causes the tube in the right arm rest to rotate counter-clockwise toward the bottom of the rod, thereby returning the pin to one of the slots. The inward movement of the left end of the belt returns the latch to one of the indents, thereby securing the belt in the adjusted position. While the comfort factor is important in inducing the operators to use the belt, the belt has also been designed to make operation of the vehicle difficult when the belt is not closed. With the belt in an upward position, as shown in FIG. 3, access to the vehicle's operating controls is restricted, as is visibility to the right side. Further, since the belt will rest in an upright position during periods of non-use but is not secured in this upright position, movement or vibration of the vehicle will tend to move the belt across the lap of the operator, thereby making latching of the belt desirable.

The pivoting mechanism of the left arm rest 62 is shown in FIG. 10. The arm rest has been mounted on a post 114, which is secured within the frame 28 of the seat assembly with a conventional fastener such as circlip 116. A spring-ball detent assembly 118, including a spring 120, a ball 122, and stops 124 and 126, is used to secure the arm rest in either a fully closed position, as shown in FIG. 2, or a fully open position, as shown in FIG. 3. In the closed position, the spring urges the ball upwardly toward stop 124 such that the midpoint of the ball is even with the line demarcating the left arm rest and the frame for maintaining the closed position. Outward pressure on the arm rest forces the ball downward against the spring and out of the seat, thereby allowing the arm rest to pivot. In the fully open position, the spring urges the ball into stop 126, thereby holding the arm rest in the open position for easy ingress to and egress from the seat.

In the use and operation of the present safety seat assembly 20, the operator enters the cab portion of the vehicle from the normal left side entry point and is seated. The left arm rest 62 is then pivoted in toward the operator against the stops and remains in that position due to the spring-ball detent assembly 118. The operator may then adjust the belt 64 forward or backward to suit his body size while the belt is in an upright position. Next, or possibly alternatively, the operator closes and latches the belt by inserting the free end into the left arm rest and then adjusts the belt forward or backward as needed by deflecting the belt downwardly. This effectively lengthens the belt and frees the locking pin 70 and the latch 112 from their engagement with slots 68 and indents 80, respectively. Once the belt is in the proper position with respect to the body of the operator, the pressure is released, the belt returns to its normal curved position, and the pin and latch engage one of the slots and indents, respectively, thereby securing the belt. Release of the belt is accomplished by depressing button 110, which moves latch 112 out of engagement with indent 80, and withdrawing the belt from the arm rest. The belt is then moved to an upright position and the left arm rest is pivoted outwardly to permit the operator to exit the vehicle.

With the belt 64 and the arm rests 60 and 62 providing lower body restraint, and the upper body restraining members 36 and 38 providing restraint for the head and shoulders, the operator is furnished with substantial protection. Virtually unrestricted visibility is provided to either side and to the rear of the vehicle due to the design configuration of the upper restraining members and support arms 32 and 34. Additionally, the normal convex orientation of the belt and its adjustability forward or backward, provide the operator with the mobility in the seat necessary for operation of industrial vehicles, such as fork lift trucks. An advantage of this semi-rigid belt is that, unlike conventional woven belts, this rubber covered belt will not become embedded with dirt; thus, the problem of operators not wanting to use dirty seat belts is eliminated. The seat assembly has been designed as a unit; thus, an old seat may simply be removed and the present safety seat assembly may be installed in its place. Confining the safety features to a defined area, while providing maximum protection and visibility, renders the present invention suitable for use with many different industrial vehicles and various overhead guard configurations, where present.

While only one embodiment of a safety seat assembly has been shown and described in detail herein, various changes and modifications may be made without departing from the scope of the present invention.

What is claimed is:

1. A safety seat assembly for use with industrial vehicles comprising upper and lower restraint means for keeping the body of the operator within the confines of the vehicle cab area, said assembly including a seat member and a back support member mounted generally perpendicular to the seat member, said upper restraint means including a right supporting arm extending laterally and forwardly from said back support member and having a first guard neans disposed on the outer end thereof and a left support arm extending laterally and forwardly from said back support member and having a second guard means disposed on the outer end thereof, said lower restraint means including a safety belt and one arm rest having one end of said safety belt connected thereto and another arm rest pivotable laterally outwardly from said seat member on a substantially horizontal plane and having a plurality of fastening means for receiving and releasably holding the other end of said safety belt.

2. The safety seat assembly as claimed in claim 1 wherein said fist guard means includes a generally rectangular first member having a plane disposed generally perpendicular to the plane of said back support member and said second guard means includes a generally rectangular second member disposed generally parallel with said first guard means, both said first and second members having open center portions.

3. The safety seat assembly as claimed in claim 2 wherein said safety belt has a spring steel insert, said belt being in a normal convex position and being deflectable downwardly towards a generally horizontal position for adjusting the belt forwardly and rearwardly.

4. The safety seat assembly as claimed in claim 3 wherein said one arm rest has a rod extending axially in said one arm rest with a plurality of slots formed in the side thereof, and one end of said belt has a hinge mechanism with a locking pin selectively engageable with said slots.

5. The safety seat assembly as claimed in claim 4 wherein said hinge mechanism includes a tube disposed around said rod and supporting said pin, and said tube is rotatable and axially slidable thereon for locating said pin in a selected slot.

6. The safety seat assembly as claimed in claim 5 wherein said other end of said safety belt has a latch mechanism mounted thereon for selective engagement with said fastening means.

7. The safety seat assembly as claimed in claim 1 wherein said one arm rest has a rod extending axially therein with a plurality of slots formed in the forward portion thereof, and said fastening means are formed in the forward portion of said pivotable arm rest.

8. The safety seat assembly as claimed in claim 7 wherein said safety belt includes a spring steel insert having a hinge mechanism with a locking pin secured to said one end thereof for selectively engaging said slots and a latch secured to said other end thereof for selectively engaging said fastening means.

9. The safety seat assembly as claimed in claim 8 wherein said belt has a normal convex position and a generally horizontal deflected position for increasing the effective length of said belt and disengaging said pin from said slots and said latch from said fastening means for sliding said belt forward and backward.

10. The safety seat assembly as claimed in claim 9 wherein said hinge mechanism includes a tube rotatable on said rod, a spring means having one end secured to the outer surface of said tube and an opposite end connected to said pin, said spring means and said pin being rotatable with said tube for deflecting said spring means and causing said pin to ride out of one of said slots for moving said belt horizontally.

11. A safety seat assembly for protecting vehicle operators comprising a frame with a seat member and a back support member mounted thereon, a first arm rest mounted on one side of said frame and extending forwardly from said back support member above and generally parallel with the plane of said seat member along the operator's right side, a generally horizontally disposed, outwardly pivotable arm rest mounted on the other side of said frame and having a first position parallel with said first arm rest and a second position approximately ninety degrees laterally ouwardly from said first position, said pivotable arm rest having a plurality of fastening means formed thereiu, and a belt having one end secured to said first arm rest and an opposite end having a latch mounted thereon for selectively engaging said fastening means.

12. A safety seat assembly as claimed in claim 11 wherein said pivotable arm rest includes a post secured to said pivotable arm rest for pivotably mounting said pivotable arm rest to said frame and a spring and ball detent mechanism for maintaining said pivotable arm rest in either of said first and second positions.

13. A safety seat assembly as claimed in claim 12 wherein said first arm rest has a rod extending axially therein with a plurality of slots formed in the outer surface of the side of said rod, and said pivotable arm rest has a wall means forming an elongated opening on the inner side, and said fastening means are indents formed in the inner surface of said wall means.

14. A safety seat assembly as claimed in claim 13 wherein said belt includes a spring steel insert with a hinge mechanism and a locking pin secured to one end thereof for selectively engaging one of said slots, said hinge mechanism and said pin being disposed within said first arm rest, and said belt also includes a latch secured to the opposite end of said belt for selectively engaging one of said indents.

15. A safety seat assembly as claimed in claim 14 wherein said belt has a normal convex orientation and a generally horizontal deflected position for increasing the effective length of said belt and disengaging said pin from one of said slots and disengaging said latch from one of said indents for moving said belt forward and backward, and said assembly includes guard means for restraining the upper body of the operator.

16. A safety seat assembly as claimed in claim 15 wherein said hinge mechanism includes a tube rotatably mounted on said rod and having a nylon liner which facilitates sliding and rotation, a spring means having one end secured to said tube and an opposite end secured to said pin, said spring means and said pin being rotatable with said tube for withdrawing said pin from one of said slots, said belt being movable horizontally when said pin is withdrawn.

17. A safety seat assembly as claimed in claim 15 wherein said guard means includes right and left support arms extending laterally from and parallel with said back support member and having generally rectangular right and left upper body restraining members disposed thereon, said restraining members being disposed generally perpendicular to said support arms.

18. In a safety seat assembly for protecting vehicles operators including a frame with a back support member, right and left guard means extend laterally from positions near the upper edge of said back support member for keeping the upper body of the operator within the confines of the vehicle cab area, and said guard means include right and left support arms extending laterally from and parallel with said back support member and having generally rectangular right and left upper body restraining members disposed thereon, said restraining members being disposed generally perpendicular to said support arms, and right and left arm rests secured to said back support member beneath said guard means, one of said arms being pivoted adjacent to said back support member for laterally, outwardly pivoting movement on a substantially horizontal plane.

* * * * *